United States Patent
Church et al.

(10) Patent No.: US 8,407,335 B1
(45) Date of Patent: Mar. 26, 2013

(54) LOG MESSAGE ARCHIVING AND PROCESSING USING A REMOTE INTERNET INFRASTRUCTURE

(75) Inventors: Christopher A. Church, Houston, TX (US); Paul Fisher, Conroe, TX (US); Eugene Golovinsky, Houston, TX (US); Pavel S Trakhtman, Houston, TX (US); Mikhail Govshteyn, Houston, TX (US)

(73) Assignee: Alert Logic, Inc., Houston, TX (US)

( * ) Notice: Subject to any disclaimer, the term of this patent is extended or adjusted under 35 U.S.C. 154(b) by 461 days.

(21) Appl. No.: 12/141,202

(22) Filed: Jun. 18, 2008

(51) Int. Cl.
*G06F 15/173* (2006.01)
*G06F 15/16* (2006.01)
*G06F 11/00* (2006.01)

(52) U.S. Cl. .......... 709/224; 709/218; 709/219; 726/13; 726/22

(58) Field of Classification Search .................. 709/223, 709/224, 230, 246, 247, 249; 713/189, 153–157; 370/230, 203.1, 395.51, 395.52, 395.53, 370/395.54, 395.61, 395.62, 395.63, 395.64, 370/395.65; 726/13, 22
See application file for complete search history.

(56) References Cited

U.S. PATENT DOCUMENTS

| | | | |
|---|---|---|---|
| 6,522,667 B1 * | 2/2003 | Oda et al. ...................... 370/474 |
| 6,618,378 B1 * | 9/2003 | Giroux et al. ............... 370/395.1 |
| 6,907,001 B1 * | 6/2005 | Nakayama et al. ........... 370/230 |
| 7,599,939 B2 | 10/2009 | DeStefano et al. |
| 2003/0009571 A1 * | 1/2003 | Bavadekar ................... 709/230 |
| 2003/0037235 A1 * | 2/2003 | Aziz et al. .................... 713/160 |
| 2003/0065727 A1 * | 4/2003 | Clarke et al. ................. 709/206 |
| 2003/0120795 A1 * | 6/2003 | Reinshmidt ................... 709/232 |
| 2005/0216774 A1 * | 9/2005 | Williams ...................... 713/201 |
| 2006/0277592 A1 * | 12/2006 | Brown et al. ...................... 726/1 |
| 2006/0294045 A1 * | 12/2006 | Suggs et al. ...................... 707/1 |
| 2007/0028001 A1 * | 2/2007 | Phillips et al. ................ 709/238 |
| 2007/0115922 A1 * | 5/2007 | Schneider et al. ............ 370/352 |
| 2007/0157302 A1 * | 7/2007 | Ottamalika et al. ............ 726/11 |
| 2007/0209015 A1 * | 9/2007 | Ritter ............................ 715/780 |
| 2007/0283194 A1 * | 12/2007 | Villella et al. .................. 714/57 |
| 2008/0016569 A1 * | 1/2008 | Hammer et al. ................ 726/23 |
| 2008/0101354 A1 * | 5/2008 | Arndt ............................ 370/389 |
| 2008/0109889 A1 * | 5/2008 | Bartels ............................. 726/7 |
| 2008/0130895 A1 * | 6/2008 | Jueneman et al. ............ 380/277 |
| 2008/0263564 A1 * | 10/2008 | Gambino ...................... 719/314 |
| 2009/0089584 A1 * | 4/2009 | Bender et al. ................ 713/176 |

(Continued)

OTHER PUBLICATIONS

Wikipedia "Bzip2", Wikipedia.org, Mar. 17, 2008, p. 1-5.*

(Continued)

*Primary Examiner* — Joseph Avellino
*Assistant Examiner* — Aftab Nasir Khan
(74) *Attorney, Agent, or Firm* — Sprinkle IP Law Group (57) ABSTRACT

An appliance is co-located on a network with computing devices. Log messages generated by the computing devices are collected by the appliance, filtered based on the content and stored in transmission priority queues based on the content. The appliance packetizes the log messages based on the transmission priority queue and the available bandwidth and compresses the packet. The appliance encrypts the packet, digitally signs the encrypted packet and sends the packet to a first data center over a public network. The first data center stores the packet in reliable storage and performs processing on the data. A copy of the packet is sent to a second data center that stores the copy and performs processing on the copied data. The appliance deletes the packet from its buffer after it has received acknowledgement that the second data center has received the packet.

20 Claims, 4 Drawing Sheets

U.S. PATENT DOCUMENTS

2009/0276771 A1* 11/2009 Nickolov et al. ............. 717/177

OTHER PUBLICATIONS

US Dept of Commerce/NIST "Federal Information Processing Standard Publication—FIPS 186-2," Jan. 27, 2000, p. 1-72.*

Seward Julian "Bzip2 compression algorithm", 1-2, Wikipedia, version 1.00, 2000.*

George, R., "LogLogic Announces U.S. Patent for Storage of Raw Log Data," LogLogic News Releases, Dec. 2, 2009, at http://www.loglogic.com/news/news-releases/2009/december/loglogic-announces-Us-patent . . . printed on Jul. 19, 2010, 1 pg.

* cited by examiner

LOG MESSAGE ARCHIVING AND PROCESSING USING A REMOTE INTERNET INFRASTRUCTURE

FIELD OF THE INVENTION

This invention relates generally to the field of log message analysis and archiving and processing.

BACKGROUND

Computer systems utilized for business system generate messages which audit user access, service errors, and other critical information about the operation of the systems. These messages are recorded in a log, managed by the computing system and therefore called log messages. Traditionally log messages are recorded to files on the local file system, or in the case of syslog enabled systems, can be redirected and stored on the local file system of separate system. Computing systems based on Microsoft Windows record log messages to the local file system via the Windows Event Log.

Recent industry and government regulations such as the Payment Card Industry Data Security Standard (PCI DSS), Sarbanes-Oxley Act (SOX), Health Insurance Portability and Accountability Act (HIPAA), and the Gramm-Leach-Bliley Act (GLBA), require that log data be collected, regularly reviewed, and securely archived. To meet the requirements of these regulations log message files must be archived for up to seven (7) years. For large organizations or organizations with specialized operations, the volume of log messages generated may require storage volumes approaching petabytes (PB) of data. This has generally resulted in significant capital investment, staffing expense and operational complexity to provide secure and reliable storage for this length of time.

Of particular interest is the complexity and cost involved in maintaining large volumes of digital information, such as log data, over the number of years required by these regulations. Simply storing log data on computer media (e.g. hard disks or tape) is prone to media deterioration and failure resulting in the loss of the data. Computer storage arrays, regardless of media, reliably handle the failure of a fraction of the total number of media devices, but over time on the order of five (5) or more year, all of the media devices in the storage array have passed the manufacturer specified duty cycle and are likely to fail in a way that is not recoverable by the storage array. The effort of maintaining large volumes of digital data reliably over this time frame therefore requires continuous investment in terms of hardware and expertise.

Current solutions to managing log data are available as part of the base operating system of computing systems, or as products offered for deployment on the customer's private network. Overall, these solutions require significant staff expertise or capital investment to deploy and maintain in a way that meets regulatory requirements, which usually must be borne by the customer alone.

SUMMARY

In accordance with some embodiments, a log collection appliance is co-located on a network and connected via the internet to a centralized data center for processing and long-term archiving. The servers, routers, switches and other network elements on the network are configured to direct log message traffic to the co-located appliance, allowing the appliance to buffer, prioritize and transmit a packetized representation of the log messages to the data center. Within this disclosure, the word "aggregate" is used interchangeably with the word "packet". The data center may analyze the log messages for regulatory compliance or customer-specified policy related incidents and archive the messages and information for long term storage.

In one embodiment, the data transmission is managed such that only the available bandwidth is utilized for transmission of log message packets or log message aggregates, so as not to interfere with the normal operation of the network. The contents of each log message packet or log message aggregate are highly compressed using a lossless compression algorithm to a ratio of at least 10-to-1 to minimize the communications bandwidth utilized for large number of log messages. Each packet or aggregate containing log messages is signed using a cryptography secure digital signature algorithm to insure the integrity of the log messages as they are processed and archived in the data center.

In addition, in one embodiment, access to the processing and archive information is provided via a web application accessible from any computer connected to the internet. Incidents and archived log messages information are presented to the customer.

Embodiments disclosed herein make use of the fact that inexpensive public internet communications bandwidth and advanced cryptography capabilities are ubiquitously available today, and further that the majority of this communications bandwidth goes unused for some significant portion of each day. Embodiments disclosed herein offer an easy way for organizations to solve compliance and security challenges by delivering log management capabilities in an on-demand model. In one embodiment, a Software as a Service (SaaS) architecture enables users to pay for the services used without any additional computing costs. In other words, using embodiments disclosed herein, customers are spared from the capital investment, staff expense and operational complexity involved in managing the enormous volume of data represented by log messages generated from their compliance relevant computing systems. They are able to leverage the reliable, secure and geographically dispersed infrastructure at a fraction of the cost to development, deploy and maintain a log management solution using techniques available on the market today A hardened distributed data center environment may be utilized to meet the secure long-term archiving dictated by current compliance regulations. For small to mid-sized enterprises, the deployment of such a computing infrastructure would exceed, or at least approach a significant proportion of, their current investment in computing systems which run their primary business operations. All processing, analysis, reporting and archiving are performed using a shared computing infrastructure. Thus, the costs normally placed on each customer to set up a processing and archiving infrastructure may be shared by many customers, and in a secure and reliable fashion.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

Advantages of the present invention will become apparent to those skilled in the art with the benefit of the following detailed description and upon reference to the accompanying drawings in which.

DETAILED DESCRIPTION

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments, examples of which are illustrated in the accompanying drawings. Wherever possible, the same reference numbers will be used throughout the drawings to refer to the same or like parts (elements).

Figure 1:
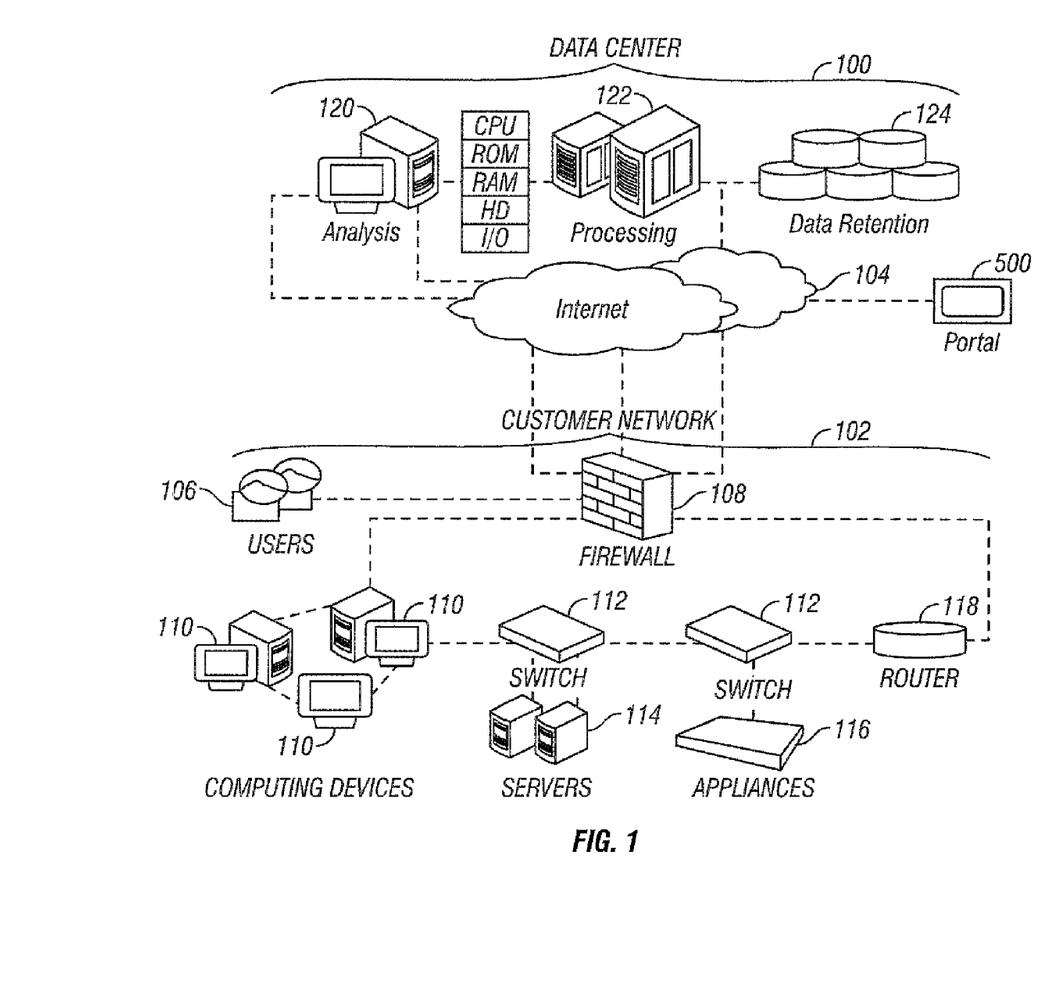
FIG. 1 depicts an architectural diagram of one embodiment of a system for log message processing using a remote Internet infrastructure.

FIG. 1 illustrates one embodiment of a system for processing log messages. Within the system, components including, but not limited to, data center 100, network 102, network 104, users 106, firewall 108, computing devices 110, switches 112, servers 114, appliance 116, and router 118 can cooperate to process log messages. As noted, the system includes appliance 116 and data center 100, each coupled to network 104. Other appliances (not shown) may also be coupled to network 102 or network 104. Network 102 may be an intranet, a private network, a WAN, a LAN, etc. Network 104 may be a public network such as the Internet. Firewall 108 may control access to router 118 and computing devices 110. Appliance 116 may be located on network 102 behind firewall 108. Appliance 116 may communicate with devices such as firewall 108, servers 114, computing devices 110, routers 118, and switches 112 on network 102 to collect log messages generated by users 106 or any of the devices. Computing devices 110 may include laptop computers, personal computers, personal digital assistants, cellular phones, etc.

Appliance 116 may be a desktop computer, a laptop computer, a workstation, or nearly any other device capable of receiving, processing, filtering, packetizing, compressing, encrypting, or sending log messages over network 104 to data center 100. In some embodiments, appliance 116 may be an application residing at one or more of the devices located on network 102. Thus, appliance 116 may be an application running on server 114, may have a portion running on firewall 108 and another portion running on router 118, etc.

In one embodiment, appliance 116 can include a central processing unit ("CPU"), read-only memory ("ROM"), random access memory ("RAM"), a hard drive ("HD"), and input/output devices. Read only memory, random access memory, and hard drive memory of appliance 116 can include media that can be read by the central processing unit and other processors or machines. Therefore, each of these types of memories may include a computer-readable medium. These memories may be internal or external to appliance 116.

Data center 100 may include analysis devices 120, processing devices 122, and data retention devices 124 for receiving, processing, and archiving log messages. Analysis devices 120, processing devices 122, and data retention devices 124 can also have a CPU, ROM, RAM, and HD, either collectively or individually. Data center 100 may include portal 500 for access by users 106 via network 104 such that log messages or data associated with the analysis of the log messages may be accessed. In some embodiments, web portal 500 may provide an interface for remote access. In some embodiments remote access may include configuring appliance 116, data retention devices 124, analysis devices 120, and/or processing devices 122. Remote access may include configuring criteria for determining what log messages are stored, how many queues are created, the size of the packets, and the like.

Figure 2:
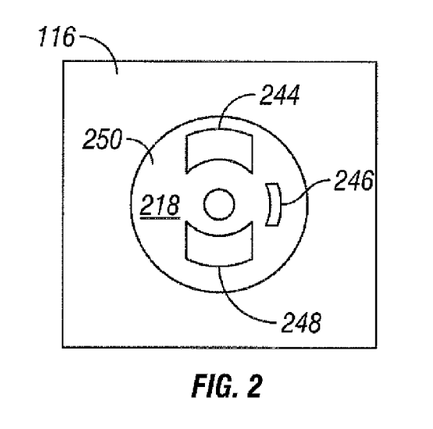
FIG. 2 depicts an illustration of one embodiment of a storage medium including software code having instructions in accordance with one embodiment.

FIG. 2 illustrates a combination of software code elements 244, 246 and 248 that may be embodied within computer-readable medium 218 on hard drive 250 in appliance 116. Alternatively, the instructions may be stored as software code elements on a DASD array, magnetic tape, floppy diskette, optical storage device, or other computer-readable medium or storage device. In an illustrative embodiment, the computer-readable instructions may be lines of compiled $C^{++}$, Java, or other language code.

Various software components may reside on a single appliance 116. For example, in some embodiments, a filtering application, a packetizing application, an encryption application, a digital signing application, a memory cache, and log message processing application may be stored in the same appliance 116. A set of computer-executable instructions in an embodiment may be contained on a data storage device, such as hard drive 250 of appliance 116.

During operation, embodiments disclosed herein include methods for providing log message processing. In some embodiments, processing may include archiving, compliance processing, systems management, or other types of processing. Embodiments may offer log message processing through a Software as a Service (SaaS) delivery platform. Appliance 116 may receive log messages collected using the Syslog, MSRPC, or other protocols. Appliance 116 may filter the messages into transmission priority queues, packetize the messages based on the priority. Appliance 116 may securely transmit the packets to data center 100 for processing in accordance with customer desires, requirements, regulatory compliance, etc.

Figure 3:
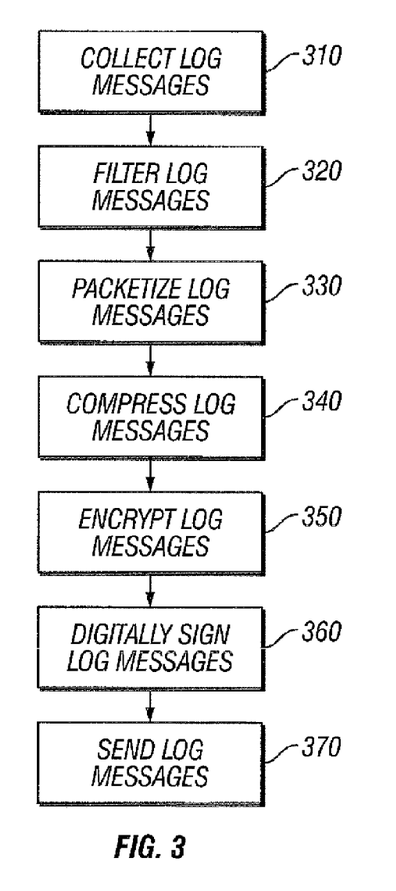
FIG. 3 depicts a flow chart of one embodiment of a method for remote archiving and processing of log messages.

FIG. 3 depicts a flow diagram for one method for processing log messages. In step 310, log messages may be collected from computing devices on network 102 and stored in conjunction with appliance 116. In some embodiments, access to Microsoft Windows log messages may be provided by remotely accessing the Windows Event Log using the Microsoft Remote Procedure Call (MSRPC). In some embodiments, a customer may configure firewall 108, servers 114, computing devices 110, routers 118 and switches 112 to send log messages to appliance 116. Appliance 116 may store a set of computer-executable instructions operable to receive log messages from computing devices 110, servers 114, switches 112, firewall 108, users 106, routers 118, or other devices located on network 102. Log messages may be sent according to the syslog protocol. RFC 3164 describes aspects of the syslog protocol. Those skilled in the art will appreciate that collection may be possible by changing the syslog pointers to appliance 116. Appliance 116 may store collected log messages in a buffer, discussed below. In some embodiments, collecting log messages may include translating the log messages using Dynamic Link Libraries (DLLs). U.S. patent application Ser. No. 12/141,209, filed Jun. 18, 2008, entitled "Log Message Collection Employing On-Demand Loading of Message Translation Libraries" describes one method for translating log messages and is hereby incorporated by reference in its entirety.

In step 320, appliance 116 may utilize a set of message content rules to filter the log messages into priority queues or discard messages not designated for retention. In some embodiments, three priority queues may be used, although any number of priority queues may be established by a user. The priority queues may be based on users 106, servers 114, computing devices 110, firewall 108, switches 112 or router 116. For example, a log message generated from a particular server 114 may have a higher priority than another server 114. A log message generated by a selected user 106 may be designated a higher priority than a log message generated by another user 106. A log message generated from outside firewall 108 may have a higher priority rating than a log message generated from inside firewall 108. The priority queues may be prioritized as high, medium or low. The priority queues may have a numerical prioritization such as 1-5. Those skilled in the art will appreciate that other prioritization formats may be utilized. The filtered and prioritized log messages may be stored in queues in appliance 116.

In step 330, appliance 116 may packetize the messages from one or more priority queues. Packetization may be based on the bandwidth of the network 104 available for communicating with data center 100 or the packetization algorithm. The bandwidth policy and packetization algorithm may independently affect the size of the packets, or may interact to affect the size of the packets.

A bandwidth transmission policy may be a set of limits specifying the bandwidth limit appliance 116 is permitted to utilize. The bandwidth limit may be specified as a number of bytes per second or some other criterion. In some embodiments, the set of limits may be composed of non-overlapping time frames, with each time frame having an associated bandwidth limit. In some embodiments, a default bandwidth may be in effect when no bandwidth limit has been specified. Thus, if the available bandwidth is high, the packet size may be larger to accommodate more log messages or more packets may be sent. By packetizing the messages based on the available bandwidth, interference with day-to-day operations of the network or devices on the network may be reduced. In an example, Table 1 depicts a sample bandwidth transmission policy. In Table 1, a first (default) bandwidth limit is set at 1500 Kbps, a second bandwidth limit is set at 200 Kbps between 0600-1800 hours, and a third bandwidth limit is set at 700 Kbps between 1800-2100 hours.

TABLE 1

| | |
|---|---|
| Default Rate | 1500 Kbps |
| 0600-1800 hours | 200 Kbps |
| 1800-2100 hours | 700 Kbps |

With the effective bandwidth transmission limit in effect, appliance 116 may follow a packetization algorithm to generate packets of log messages for transport. As log messages arrive at appliance 116, they can be sorted into transmission priority queues based on a prioritization policy, such as in step 320. Appliance 116 may utilize a packetization algorithm to select log messages from the various queues based on the priority of the log message, and fill packets to the configured size limit.

Table 2 depicts one embodiment of a packetization algorithm that may be used by appliance 116 to packetize log messages.

TABLE 2

| | |
|---|---|
| 1. Select log messages from the highest priority queue available until: | 1.1 Size limit of packet is reached;<br>1.2 The queue is exhausted; or<br>1.3 The next log message is outside of the packet time interval. |
| 2. Select log messages from the next lower queue available for the current interval, until: | 2.1 The size limit of the packet is reached;<br>2.2 The queue is exhausted; or<br>2.3 The next log message is outside the packet time interval. |
| 3. Repeat the second step until: | 3.1 The size limit of the packet is reached; or<br>3.2 All queues have been processed. |

In one embodiment, when appliance 116 selects the highest priority queue, a queue may be skipped if the queue was exhausted, or may be skipped on each subsequent execution until the lowest priority queue is exhausted on the last execution of the algorithm, the queue is skipped for a priority-specific time period or the contents of the queue would fill more than half the contents of the size limits of packets.

Embodiments may also allow a user to designate rules for packetizing. For example, a user may establish criteria such that all high priority log messages are packetized and sent from appliance 116 to data center 100 immediately, regardless of bandwidth. A user may establish criteria such that medium priority log messages are sent only during selected hours, or when the bandwidth is at a selected level. A user may establish criteria such that low priority log messages are sent only during selected hours, only when the bandwidth is at its highest level, or some other criteria. Thus, a user is able to designate criteria that enable embodiments to optimize the transmission of information to ensure higher priority messages are received timely, but without decreasing transmission rates (or increasing bandwidth costs) due to the transmission of lower priority messages. It will be apparent that a wide variety of criteria may be utilized by a user to designate these types of rules.

In step 340, appliance 116 may compress the packets. The compression of the log message data may be performed using the bzip2 algorithm [BZIP2]. In step 350, appliance 116 may encrypt each packet before sending the packet over network 104. The SHA-256 algorithm is one example of an encryption algorithm which may be used to encrypt such messages. In step 360, appliance 116 may digitally sign the encrypted packet before sending the packet over network 104. The FIPS 186-2 digital signature algorithm is one example of a digital signature algorithm which may be used to digitally sign such messages. Those skilled in the art will appreciate that other compression, encryption and signature algorithms may be used.

Once constructed, in step 370 packets that have been compressed, encrypted and digitally signed may be transmitted to data centers via encrypted transport over a public network, such as the Internet, and processed. In some embodiments, appliance 116 can communicate with data center 100 to send packets of log messages from network 102 to data center 100 using network 104. Communications between appliance 116 and data center 100 can be accomplished using electronic, optical, radio-frequency, or other signals. For example, when a user accesses appliance 116, appliance 116 may convert the signals to a human understandable form when sending a communication to the user and may convert input from a human to appropriate electronic, optical, radio-frequency, or other signals to be used by data center 100. Similarly, when an operator accesses data center 100, data center devices 120, 122, and 124 may convert the signals to a human understandable form when sending a communication to the operator and may convert input from a human to appropriate electronic, optical, radio-frequency, or other signals to be used by appliance 116.

The transmission of packets may be controlled via the appliance in order to limit the amount of network bandwidth utilized, which allows the customer to manage the impact on their network.

Embodiments disclosed herein may satisfy regulatory compliance processing without the storage volume normally associated with archiving log messages. For example, if log messages are retained in response to a statutory requirement, a digital signature may be used to verify that the compressed and encrypted log messages archived in a remote infrastructure are the same as the original log messages. As a result, a user may satisfy the statutory requirement using a fraction of the storage volume.

Figure 4:
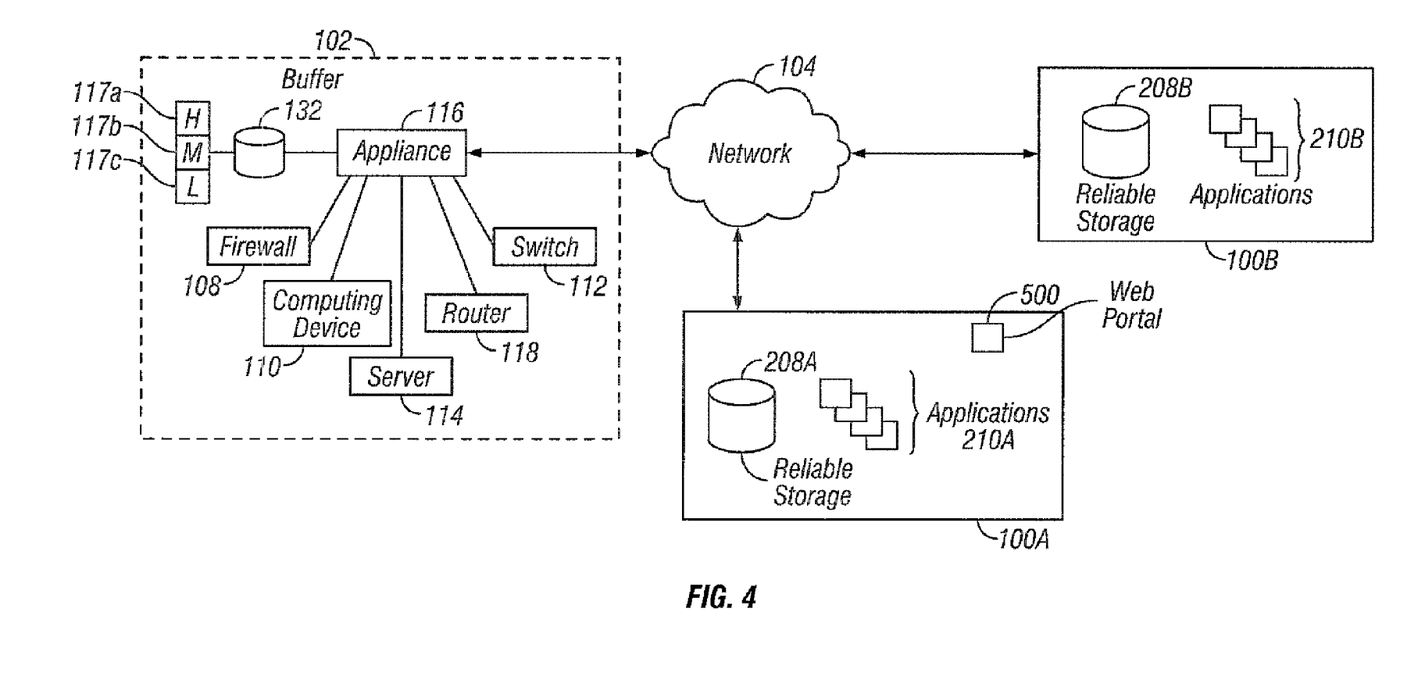
FIG. 4 depicts a block diagram of one embodiment of a system for log message processing using a remote internet infrastructure.

FIG. 4 depicts a block diagram of one embodiment of a system for archiving log messages. Appliance 116 on network 102 may communicate with computing devices 110, servers 114, switches 112 and routers 118, each of which may forward log messages to appliance 116. Appliance 116 may filter the log messages and prioritize the log messages received from computing devices 110, servers 114, switches 112, routers 118 and other devices located on network 102 based on user-defined criteria. Examples include, but are not limited to, the type of computing device, the identification (username or password) of a person 106 accessing or attempting to access network 102, the time of day, the program or application the user is using or attempting to use, the length of time the program is being used, and what information is being requested. In some embodiments, appliance 116 may store the filtered log messages in transmission priority queues such as queues 117a, 117b and 117c in buffer 132. Buffer 132 or queues 117a, 117b and 117c may be internal or external to appliance 116. In some embodiments, filtering may be based on a program, address or facility that generated the log message.

Appliance 116 may communicate with first data center 100A over network 104 to send packets from appliance 116 to first data center 100A. First data center 100A may receive packets which have been compressed, encrypted or digitally signed and store the packets in reliable storage 208A. First data center 100A may include applications 210A that are useful for analyzing the log messages in accordance with customer processing desires, requirements, protocols, etc. Applications 210A may be stored on analysis devices 120 or processing devices 122 (not shown in FIG. 4). First data center 100A may include applications 210A that may process log message packets to decompress, decrypt, and verify packets and process the data contained in each packet. Examples of processing which may occur at first data center 100A include, but are not limited to, normalizing log messages, extracting data from log messages, full text indexing of log messages, parsing log messages, structured output, data persistence, correlating log message data, and informing and alerting users of various events and processing results.

In some embodiments, full text indexing may be performed real time to enable users to access the log messages. A drawback of prior art archiving is that there may be a delay of days or weeks before the log messages are available for searching. Embodiments disclosed herein allow nearly instantaneous search capability. In some cases, such as compliance processing, this enables a company, medical office, or other entity required to perform compliance processing to quickly access the log messages. Advantageously, if there has been a breach of security, an unauthorized access, or some other event covered by HIPAA, GLB, SOX, or some other regulation, the log messages may be accessible almost instantly, which may be critical to preventing further events.

In some embodiments, parsing may be performed nearly real time. In some embodiments, parsing may be available nearly real-time for high-priority log messages, particularly when the user has designated that log messages be sent immediately to another location.

In some embodiments, structured output processing may be performed on log messages. Structured output may be used to display information about log messages. For example, structured output processing may indicate when certain computing devices are most active, what programs and applications users 106 are accessing, and the like.

In some embodiments, persistence processing may be performed based on the type of information or regulations pertaining to the data. For example, legislation may require information to be retained for seven years. In this situation, the persistence processing may be more robust than persistence processing that may be based on a three-year requirement. Embodiments disclosed herein allow users to define criteria for archiving and processing, such that each customer may designate the storage requirements they need, etc. In this way, a user that requires less robust storage requirements may not need to pay for a robust storage system, but may easily change the storage requirements if needed.

In some embodiments, advanced correlation processing may also be performed. For example, appliance 116 may send log messages indicating that the same user 106 has tried to access server 114 from several different computing devices 110 at the same time. Each attempt, when viewed as a standalone event, may not be noteworthy. However, advanced correlation processing may determine that the password for user 106 has been compromised and that multiple users 106 attempting to use the same password should be blocked. In some embodiments, advanced correlation processing may be useful for determining when firewall 108 has been breached, when servers 114 are being attacked, or the like.

Alerting may refer to sending a communication based on a log message. First data center 100A may process the log messages in a packet such that information is available for users 106.

Data center 100A having applications 210A for processing may provide many advantages. As an example, if an unauthorized user 106 accessed a patient file stored on server 114, a log message may be generated to indicate that an unauthorized person 106 was accessing the database, a log message may be generated to indicate that user 106 had logged on to a particular computing device 1110, a log message may be generated to indicate that user 106 had accessed server 114, etc. Each log message generated from the event may be filtered as a high priority message and sent immediately to data center 100A. Applications 210A in data center 100A may process the log messages to determine the response. In some embodiments, data center 100A may send an alert to user 106 in network 102 notifying the user that they are not authorized to access the database, send an alert to the supervisor of user 106, send an alert to the computing device 110 upon which unauthorized user 106 is accessing the database, send an alert to server 114, etc. The alert may inform user 106 to stop accessing the database, a set of instructions for computing device 110 to logoff the unauthorized user, a set of instructions to deny further access to server 114, etc.

First data center 100A may send a copy of each compressed, encrypted and digitally signed packet to second data center 100B. Thus, second data center 100B may receive a copy of the packet of log messages that has been packetized, compressed, encrypted or digitally signed and sent to first data center 100A. Second data center 100B may include storage 208B and applications 210B. Applications 210B may perform the same or different processing on packets in second data center 100B that applications 210A perform on packets received in first data center 100A. For example, in some embodiments, data center 100B does not perform alert processing. In some embodiments, data center 100B may perform some alert processing but may not send an alert. In some embodiments, by having redundant or similar functionality, data center 100B may assume the functions of data center 100A in the event data center 100A is unable to function as the primary data center, such as due to a natural disaster or other outside factor, or due to being taken off-line for maintenance or some other internal factor. In some embodiments, data center 100A may be the primary data center for a first network and the secondary (backup) data center 100B for a second network, and data center 100B may be the primary data center for second network and the secondary (backup) data center for first network.

After data center 100B has received a copy of the packet sent from data center 100A, data center 100B may send an acknowledgement message to data center 100A. Upon receipt of the acknowledgment message, data center 100A may forward the message or may send a copy of the message to appliance 116. If first data center 100A does not receive an acknowledgement within a selected time limit, first data center 100A may send another copy of the packet. Upon receipt of an acknowledgement message from data center 100A, appliance 116 may delete the corresponding packet from memory. If appliance 116 does not receive an acknowledgement within a selected time limit, appliance 116 may send another copy of the packet. An advantage is that the storage volume needed for storage of information on network 102 may be minimized based on criteria set up by the customer, and may ensure the log messages are securely stored at a remote internet infrastructure before deleting the log messages off network 102.

Figure 5:
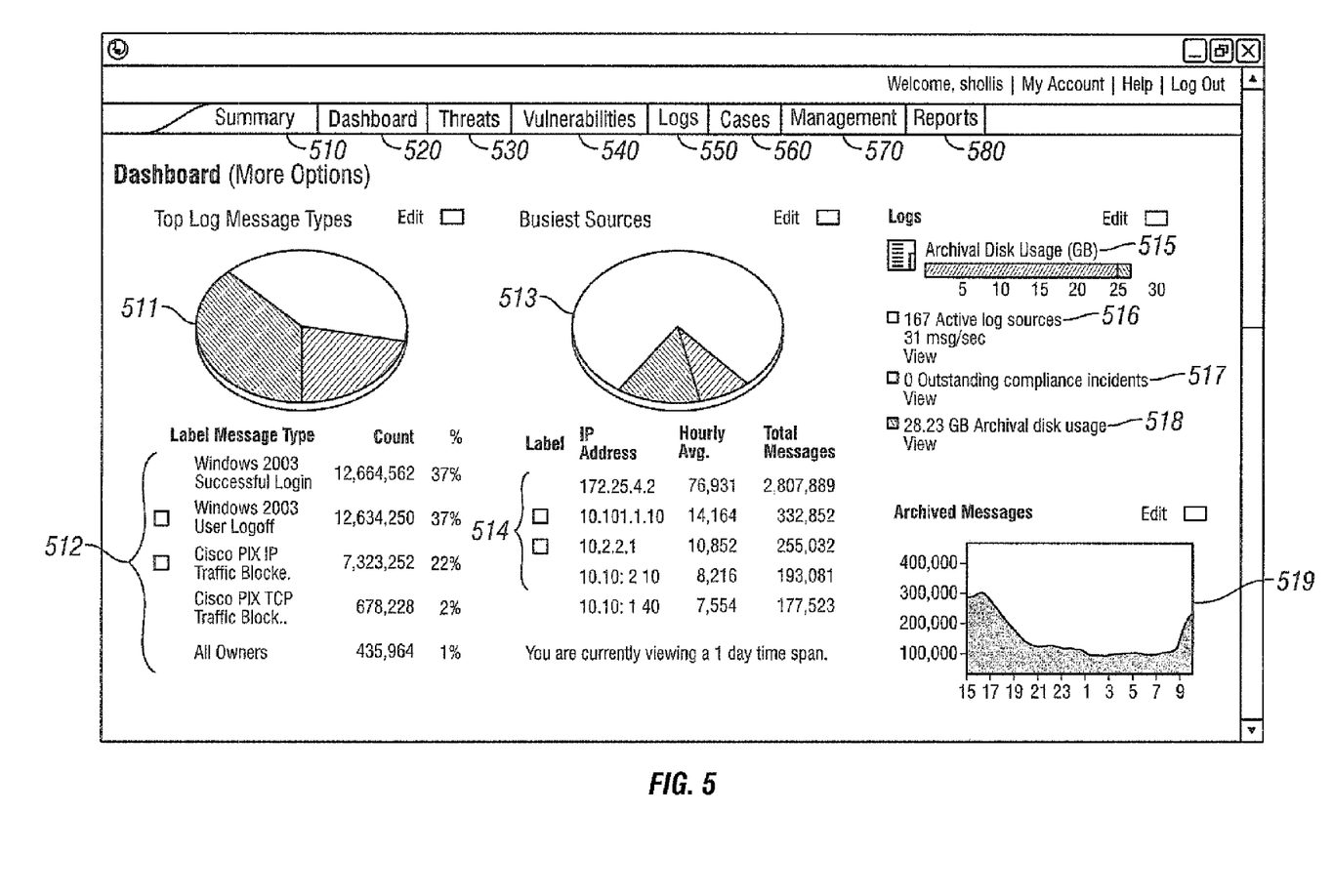
FIG. 5 depicts one embodiment of an interface used with a web portal.

FIG. 5 depicts an illustration of a web portal 500 according to one embodiment. As depicted in FIG. 5, web portal 500 may allow users 106 on network 102 to view information associated with log messages sent to data center 100A. In some embodiments, graph 511 or data 512 may be used to display information about the types of log messages received by data center 100A. In some embodiments, graph 513 or data 514 may be used to display information about the busiest IP addresses. In some embodiments, graph 515 or data 516, 517 or 518 may be used to display information about archival disk usage. An advantage to embodiments disclosed herein is that the operator of network 102 does not need the capital investment required by prior art approaches. For example, graph 515 illustrates (and data 518 depicts) that archival disk usage is 28.23 GB. Thus, the customer may be billed for only 28.23 GB of storage volume at data center 100A. As the customer's storage need grows, the customer may be billed for the increased storage volume. In this way, the customer may maintain enough storage on a day-to-day basis. In some cases, this may be more desirable than having a user estimate how much storage volume they will need and purchase an appropriate storage device. In the case of a new business, the owner may try to estimate the storage volume needed months or years in the future, and may underestimate the amount of storage volume needed or may overestimate the storage volume needed. If too little storage volume is purchased, critical data might be lost, which may have regulatory consequences. If too much storage volume is purchased, the cost may negatively affect the financial status of the company. Data 516 may be used to provide information on the number of log sources generating log messages. Data 517 may be used to provide information on the number of log messages identified for processing.

In some embodiments, graph 519 may be used to display information about archived messages, such as the quantity stored in a given time period. Graph 519 may be used to show that the number of messages archived in data center 100A fluctuates during a 24-hour period. For example, graph 519 illustrates that the number of messages sent around hour 17 was higher than any other time period, which may be an indication of more log messages generated during that time period, or may be an indication that more bandwidth was available during that time.

Web portal 500 may include other information displayed as Summary 510, Dashboard 520, Threats 530, Vulnerabilities 540, Logs 550, Cases 560, Management 570, Reports 580, or some other tool. Web portal 500 may allow users to establish criteria for log message archiving and processing. For example, web portal 500 may allow a user to establish the number of priority queues, the criteria for filtering log messages into the priority queues, the criteria for packetizing the log messages, and any other criteria. Thus, some or all the functionality of log message archiving and processing may be performed using a remote internet infrastructure.

In the foregoing specification, the disclosure has been described with reference to specific embodiments. However, one of ordinary skill in the art will appreciate that various modifications and changes can be made without departing from the spirit and scope of the invention disclosed herein. Accordingly, the specification and figures disclosed herein are to be regarded in an illustrative rather than a restrictive sense, and all such modifications are intended to be included within the scope of the disclosure.

The invention claimed is:

1. A method comprising:
   receiving a plurality of log messages from a plurality of computing devices on a computer network;
   filtering the plurality of log messages based on one or more sets of message content rules so as to aggregate one or more of the plurality of log messages based on priority, wherein each of the plurality of log messages is discarded or retained in one of a plurality of priority queues, wherein the plurality of priority queues comprise at least three queues;
   generating at least one aggregate prior to sending the at least one aggregate over a network connection, wherein each of the at least one aggregate contains a set of retained log messages from one or more of the plurality of priority queues, wherein the generating step further comprises:
      selecting, in order of priority, one or more of log messages stored in a first of the plurality of priority queues until a packet size limit is reached, the first priority queue is exhausted, or a next log message is outside of a packet time interval;
   compressing the at least one aggregate;
   encrypting the at least one aggregate;
   digitally signing the at least one aggregate; and
   sending the at least one aggregate over the network connection to a data center.

2. The method of claim 1, wherein the plurality of priority queues comprises at least a high priority queue, a medium priority queue, and a low priority queue.

3. The method of claim 1, wherein the compressing step is performed using the bzip.2 algorithm.

4. The method of claim 1, wherein the encrypting step is performed using the SHA-256 algorithm.

5. The method of claim 1, wherein the digitally signing step is performed using the FIPS 186-2 algorithm.

6. The method of claim 1, wherein the generating step further comprises:
   a) selecting one or more log messages stored in a second of the plurality of priority queues until the packet size limit is reached, the second priority queue is exhausted, or the next log message is outside of the packet time interval; and
   b) repeating the a) step until the packet size limit is reached or all of the plurality of priority queues have been processed.

7. The method of claim 1, further comprising:
   determining an available bandwidth, wherein the generating step is performed based in part on the available bandwidth; and
   sending the at least one aggregate within limits of the available bandwidth.

8. The method of claim 7, wherein the available bandwidth changes with respect to time.

9. The method of claim 7, wherein the limits comprise non-overlapping time frames, with each of the non-overlapping time frames having an associated bandwidth limit for transmission.

10. An appliance, comprising:
    a memory;
    a processor; and
    a set of computer-executable instructions stored in the memory, wherein the processor is operable to execute the instructions to:
       receive a log message;
       discard or retain the log message in one of a plurality of queues in the memory based on one or more sets of message content rules so as to facilitate aggregation of one or more of the plurality of log messages based on priority, wherein the plurality of queues comprise at least three queues;
       generate at least one aggregate prior to sending the at least one aggregate over a network connection, wherein each of the at least one aggregate contains a set of retained log messages from one or more of the plurality of queues, wherein in generating the at least one aggregate the instructions are further executable to select, based at least in part on priority, one or more log messages from a first of the plurality of priority queues until a packet size limit is reached, the first priority queue is exhausted, or a next log message is outside of a packet time interval;
       compress the at least one aggregate;
       encrypt the at least one aggregate;
       digitally sign the at least one aggregate; and
       send the at least one aggregate over the network connection to a data center.

11. A method comprising:
    at a network device, filtering a plurality of log messages based on one or more sets of message content rules so as to aggregate one or more of the plurality of log messages based on priority, wherein each of the plurality of log messages is discarded or retained in one of a plurality of priority queues, wherein the plurality of priority queues comprise at least three queues;
    generating at least one aggregate prior to sending the at least one aggregate over a network connection, wherein each of the at least one aggregate contains a set of retained log messages, wherein the generating step further comprises:
    a) selecting, in order of priority, one or more of log messages stored in a first of the plurality of priority queues until a packet size limit is reached, the first priority queue is exhausted, or a next log message is outside of a packet time interval;
    b) selecting one or more log messages stored in a second of the plurality of priority queues until the packet size limit is reached, the second priority queue is exhausted, or the next log message is outside of the packet time interval; and
    c) repeating the b) step until the packet size limit is reached or all of the plurality of priority queues have been processed;
    compressing the at least one aggregate;
    encrypting the at least one aggregate;
    digitally signing the at least one aggregate; and
    sending the at least one aggregate over the network connection to a data center.

12. A system comprising:
    an appliance comprising:
       a memory;
       a processor; and
       a set of computer-executable instructions stored in the memory, wherein the processor is operable to execute the instructions to:
          receive a log message;
          discard or retain the log message in one of a plurality of queues in the memory based on one or more sets of message content rules so as to facilitate aggregation of one or more of the plurality of log messages based on priority, wherein the plurality of queues comprise at least three queues;
          generate at least one aggregate prior to sending the at least one aggregate over a network connection, wherein each of the at least one aggregate contains a set of retained log messages from one or more of the plurality of queues, wherein in generating the at least one aggregate the instructions are further executable to select, based at least in part on priority, one or more log messages from a first of the plurality of priority queues until a packet size limit is reached, the first priority queue is exhausted, or a next log message is outside of a packet time interval;

compress the at least one aggregate;
encrypt the at least one aggregate;
digitally sign the at least one aggregate; and
send the at least one aggregate over the network connection;

a first data center comprising:
a memory for storing the at least one aggregate received from the appliance;
one or more applications for processing the at least one aggregate and the retained log messages contained in the at least one aggregate; and
a web portal for displaying one or more of the retained log messages; and a second data center comprising:
a memory for storing a copy of the at least one aggregate received from the first data center;
one or more applications for processing the retained log messages contained in the copy of the at least one aggregate received from the first data center.

13. The system of claim 12, wherein the one or more applications in the first data center and in the second data center are operable to perform one or more of full text indexing, parsing, persistence processing, structured output processing, advanced correlation processing, and alerting.

14. The system of claim 12, wherein the appliance is operable to:
determine an available bandwidth for transmission; and
generate the at least one aggregate containing the log messages based in part on the available bandwidth.

15. The system of claim 14, wherein the appliance is operable to:
a) select one or more of the log messages stored in a second of the plurality of priority queues until the packet size limit is reached, the second priority queue is exhausted, or the next log message is outside of the packet time interval; and
b) repeat a) until the packet size limit is reached or all of the plurality of priority queues have been processed.

16. The system of claim 12, wherein graphical information associated with the log messages received by the first data center or the second data center is accessible via the web portal.

17. The system of claim 16, wherein criteria for filtering a log message is established via the web portal.

18. A method comprising:
receiving a log message into an appliance on a network;
discard or retain the log message in one of a plurality of priority queues in a memory based on one or more sets of message content rules so as to facilitate aggregation of one or more of the plurality of log messages based on priority, wherein the plurality of priority queues comprise at least three queues;
generating at least one aggregate prior to sending the at least one aggregate over a network connection, wherein each of the at least one aggregate contains a set of retained log messages from one or more of the plurality of priority queues, wherein the generating step further comprises:
selecting, based at least in part on a priority associated with the retained log messages, one or more of log messages stored in a first of the plurality of priority queues until a packet size limit is reached, the first priority queue is exhausted, or a next log message is outside of a packet time interval;
compressing the at least one aggregate;
encrypting the at least one aggregate;
digitally signing the at least one aggregate;
sending the at least one aggregate over the network connection to a first data center;
storing, by the first data center, the at least one aggregate received from the appliance;
processing the at least one aggregate and one or more log messages contained in the at least one aggregate using one or more applications in the first data center;
sending a copy of the at least one aggregate received by the first data center to a second data center;
receiving the copy of the at least one aggregate sent from the first data center;
storing the copy of the at least one aggregate received from the appliance in reliable storage in the second data center;
processing one or more log messages contained in the at least one aggregate using one or more applications in the second data center;
sending a first message from the second data center to the first data center acknowledging receipt of the copy of the at least one aggregate;
receiving the message, by the first data center;
sending a second message from the first data center to the appliance acknowledging receipt of the at least one aggregate; and
deleting the at least one aggregate stored in the appliance memory in response to receiving the second message from the first data center.

19. The system of claim 18, wherein the appliance is configured to perform:
a) selecting one or more of the log messages stored in a second of the plurality of priority queues until the packet size limit is reached, the second priority queue is exhausted, or the next log message is outside of the packet time interval; and
b) repeating a) until the packet size limit is reached or all of the plurality of priority queues have been processed.

20. The system of claim 18, wherein the second data center is operable to assume the role of the first data center.

* * * * *